United States Patent
Harel et al.

(12)

(10) Patent No.: US 6,505,190 B1
(45) Date of Patent: Jan. 7, 2003

(54) INCREMENTAL FILTERING IN A PERSISTENT QUERY SYSTEM

(75) Inventors: Dov Harel, Haifa (IL); Yair Helman, Natanya (IL); Uri Barash, Tel-Mond (IL)

(73) Assignee: Microsoft Corporation, Redmond, WA (US)

( * ) Notice: Subject to any disclaimer, the term of this patent is extended or adjusted under 35 U.S.C. 154(b) by 139 days.

(21) Appl. No.: 09/606,431

(22) Filed: Jun. 28, 2000

(51) Int. Cl.[7] ............................................. G06F 17/30
(52) U.S. Cl. ......................................................... 707/2
(58) Field of Search ................................ 707/102, 103, 707/5, 10, 3, 2; 709/223

(56) References Cited

U.S. PATENT DOCUMENTS

| | | | | |
|---|---|---|---|---|
| 5,765,159 A | * | 6/1998 | Srinivasan | 707/100 |
| 5,873,081 A | | 2/1999 | Harel | 707/3 |
| 6,006,225 A | * | 12/1999 | Bowman et al. | 707/10 |
| 6,289,353 B1 | * | 9/2001 | Hazlehurst et al. | 707/101 |
| 6,366,956 B1 | * | 4/2002 | Krishnan | 707/4 |

\* cited by examiner

*Primary Examiner*—Wayne Amsbury
*Assistant Examiner*—Sana Al-Hashemi
(74) *Attorney, Agent, or Firm*—Woodcock Washburn LLP (57) ABSTRACT

A system and method track changes to a document and analyze the changes to the document against a set of predefined queries without re-analyzing the entire document. Hence, after a document has been processed in the system (i.e., had its terms matched against the set of predefined queries), only a small subset of the document needs to be reprocessed and analyzed after changes (i.e., edits) are made. The analysis of the small subset is accomplished by maintaining an incremental-results data set for each document. The incremental-results data set is much smaller than the actual document, only comprising a set of unique words found in a document. After a document is changed, only the words deleted or added to the changed portion are used to update the incremental-results data set.

18 Claims, 11 Drawing Sheets

INCREMENTAL FILTERING IN A PERSISTENT QUERY SYSTEM

TECHNICAL FIELD

The present invention relates generally to systems and methods for querying documents against persistent queries and more particularly to a system for querying incremental document changes in a persistent query system.

BACKGROUND OF THE INVENTION

The amount of information generated, managed, retrieved, and so on is expanding at an exponential rate. As a result, tools for managing the information are gaining significance as users attempt to control and harness the information contained in documents, web pages, and the like. For example, increasingly, business entities are instituting document management systems that facilitate the control and sharing of documents generated by their users. Such systems employ "electronic filtering" techniques to assist users in sorting through the massive amounts of information.

A key aspect of such systems is a mechanism that enables users to submit queries that are compared to properties of documents managed by the document management systems. As it turns out, document management systems, while generally built upon database technology, exhibit usage characteristics that can be exploited to enhance system performance. For example, many users submit queries that remain persistent such that as new documents are generated and entered into the system, the new documents are compared to previously submitted queries. Thus, the queries are stored and compared against a stream of incoming documents. The user queries generally consist of one or more search terms (or document properties) connected by one or more Boolean operators. This task is alternatively referred to as "selective dissemination of information," or as the "inverted query problem."

The primary difficulties in document filtering arise from the massive scale of queries to be evaluated against the high frequency of incoming documents to be filtered. For example, news filtering on the Internet may involve dealing with a stream of potentially many, many documents per second, with each document being filtered against millions of user queries. Comparing each document against each query is impractical, as providing the hardware capable of performing acceptable throughput is cost-prohibitive.

As a result, known filtering systems reduce the time taken to examine a document by first eliminating all queries which are irrelevant to a given document. For example, a relatively rapid test can be performed to eliminate any monotone logic queries (queries which do not contain non-monotone operators such as negation) which consist solely of words which are not in the document. Moreover, statistical techniques can speed up the detection of a query's relevance or irrelevance to a particular document.

However, after the irrelevant queries have been eliminated, the document still must be tested against the (possibly large) number of remaining queries, and such testing is relatively slow. Moreover, if non-monotone operators are allowed, initially eliminating queries having non-monotone operators significantly complicates the pre-filtering elimination process.

Other systems compile sets of user queries into acyclic graphs. The acyclic graph technique lists all search terms as endpoints (i.e. sources) in the graph and combines the set of user queries into a hierarchy of query nodes. The acyclic graph reduces redundancies by combining a set of queries into a single query. Thereafter, a document is scanned for terms matching the acyclic-graph source nodes. The entire set of queries comprising the graph is then substantially simultaneously evaluated. As a result, a document need only be scanned once for matching query terms. Unfortunately, when a document is edited, current systems require that the entire document be rescanned and the entire acyclic-graph query to be re-evaluated. When the document is large and the combined acyclic-graph query complex, the processing time is significant. This is so even where the editorial changes to the document are relatively minor. Re-filtering the entire changed document against the queries consumes system resources and degrades system performance.

A goal of the present invention is to overcome the drawbacks of the prior art by presenting methods and apparatus that reduce the processing resources required to re-filter an edited document.

SUMMARY OF THE INVENTION

The present invention provides for a system and method for analyzing changes to a document. The system analyzes the incremental changes to the document against the user queries without requiring the entire document to be re-analyzed. After a document has been once analyzed by the system, subsequent changes only require that a small subset of the document be reprocessed. The analysis of the small subset is facilitated by maintaining an incremental-results data set for each document.

The first step in the analysis is to generate a dictionary of terms from user submitted queries. The second step is to generate an incremental-results data set that reduces the document to a set of words that match dictionary terms. Subsequent changes to the document allow the changes to be compared to the dictionary terms. The resulting set of changes as cross-referenced by the dictionary such that only the words deleted or added to the changed portion are used to update the incremental-results set.

According to another aspect of the invention, the number of queries evaluated after document changes are made can be reduced as well. The invention recognizes that many documents undergo changes in particular phases of development. As a result, queries may be selectable based on document phase as well. When a document undergoes changes, the document changes may only need to be filtered against the set of queries relevant to a particular phase.

Other aspects of the present invention are described below.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings exemplary constructions of the invention; however, the invention should not be limited to the specific methods and instrumentalities disclosed. In the drawings.

DETAILED DESCRIPTION OF THE INVENTION

Overview

Electronic filtering refers to an inverted query that matches an incoming stream of information against a set of predefined queries. Like traditional queries, the inverted queries comprise a set of text strings joined together by Boolean logic operations. In one significant application, electronic filtering matches incoming documents such as would be useful in a subscription system, a document management system, and so on. In such electronic document filtering systems, a user may submit a query and have the system store the query and produce documents that match the query. As the number of documents and the number of users of electronic document filtering systems grow, the scale of evaluating the documents against the queries becomes an enormous task, as each of a large number of document must be compared against each of a large number of queries. Moreover, if a minor change is made to a document, present systems re-analyze the entire document against all of the user queries. In systems containing large numbers of documents that are continually undergoing change, the process of re-analyzing each document against each query every time that it undergoes a minor change may severely tax system resources.

The present invention addresses the need for a system and method for tracking changes to a document and only scanning the changes against a set of predefined queries. Hence, after a document has been processed in the system (i.e., had its terms matched against the set of predefined queries), only a small subset of the document needs to be reprocessed and scanned after changes are made. This scanning of the small subset is accomplished by maintaining an incremental-results data set for each document. The incremental-results data set is much smaller than the actual document, only comprising a set of unique words found in a document. After a document is changed only the words deleted or added to the changed portion are used to update the incremental results set.

Exemplary Operating Environment
1. A Computer Environment

Figure 1:
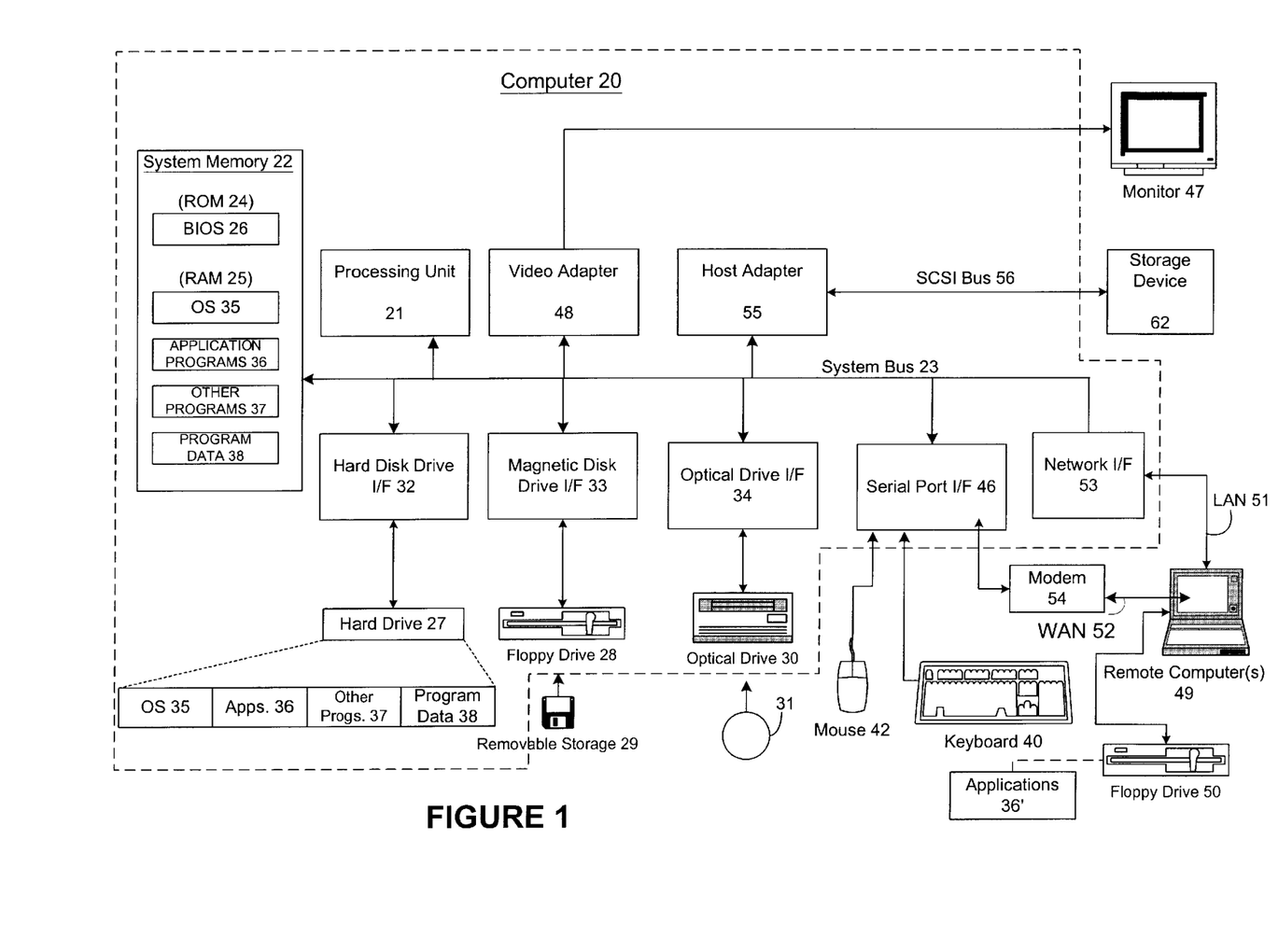
FIG. 1 is a block diagram representing a computer system in which aspects of the present invention may be incorporated.

FIG. 1 and the following discussion are intended to provide a brief general to description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB).

A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

2. A Network Environment

Figure 2:
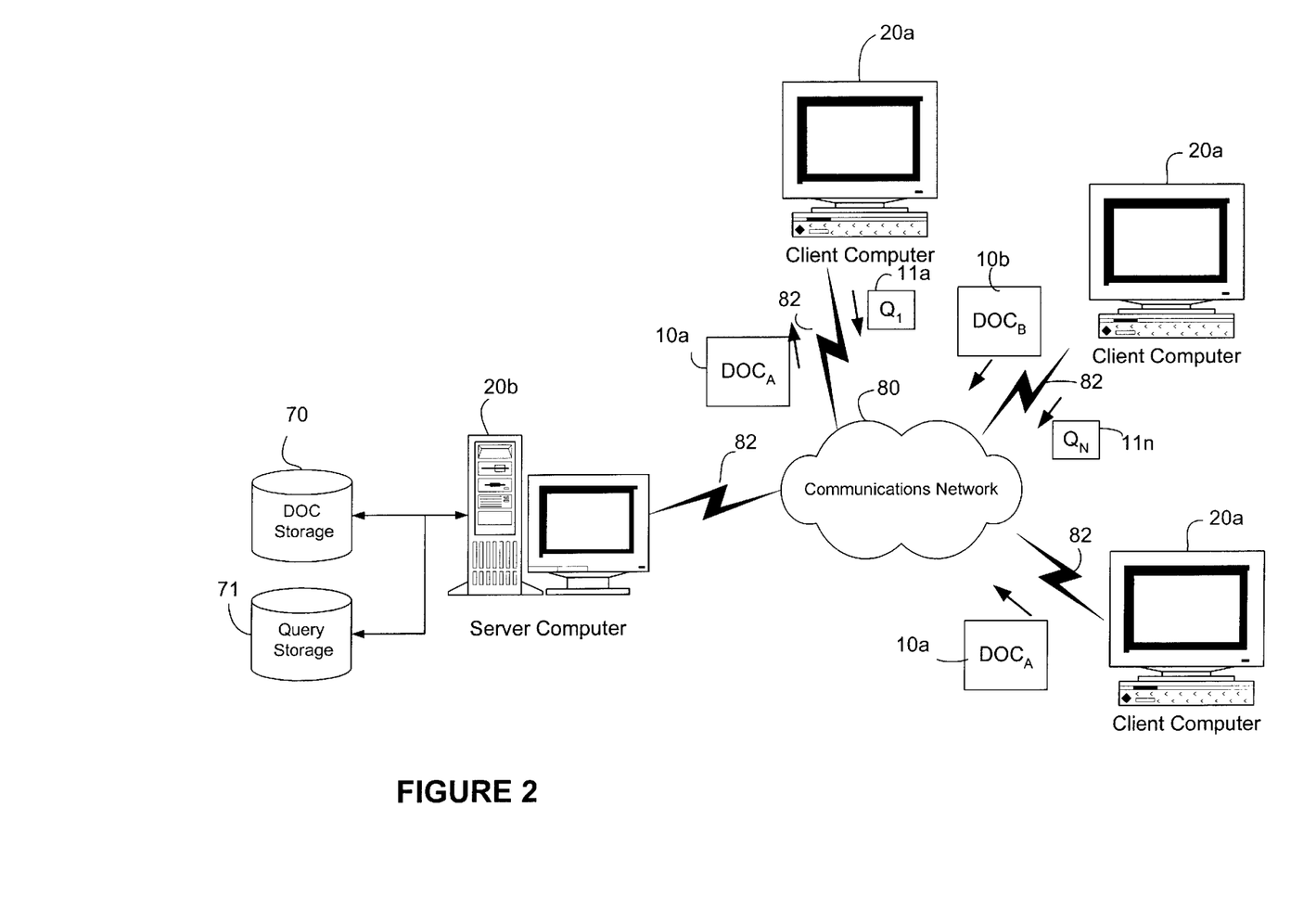
FIG. 2 is schematic diagram representing a network computer model in which aspects of the present invention may be incorporated.

FIG. 2 illustrates an exemplary environment in which the present invention may be employed. Of course, actual environments can be arranged in a variety of configurations; however, the environment is shown here in the context of a client server system to provide a framework for understanding the type of environment in which the present invention operates. The system may include client computers 20a, which could be personal computers, thin clients, hand-held computing devices, and so on. Additionally, the system may include a server computer 20b, Doc (i.e., Document) storage 70, and Query Storage 71, which are coupled to and controlled by server computer 20b. The client and server computers communicate with each other by way of communications network 80, which may be a LAN, a WAN, an intranet, the Internet, etc.

Client computers 20a and server computer 20b are connected to the communications network by way of communications interfaces 82. Communications interfaces 82 can be any one of the well-known communications interfaces such as Ethernet connections, modem connections, DSL connections and so on. Communications interfaces 82 may also be by way of an intermediate communications network such as a LAN.

According to aspects of the present invention, users of client computers 20a may generate documents (e.g., $DOC_A$ 10a, $DOC_B$ 10b) that must be stored for later retrieval for editing, viewing, and the like. The generic term user(s) is used herein to designate all users of the system; however, in practice a user may be distinguished into different classes depending on his or her particular use. For example, a user may be a producer of documents (i.e., an author/editor/creator), a consumer (i.e. a reader trying to find particular documents), or both. As used herein, the term document refers to any object that contains data and may contain text, graphics, special codes, or a combination of some or all of these. Documents may be any object, word processing document, web page, database record, stream of events (or event log), etc. To facilitate document management, the documents generated by client computers 20a are stored in DOC storage 70 and are thus transmitted to server computer 20b over communications network 80. Server computer 20b then determines the proper storage of the documents in DOC storage 70.

In addition to the generation of documents, users of client computers 20a may also desire to share documents with other users. As used herein the term "user" is not limited to physical persons but may also include automated processes. In order to consume documents generated by other users, users make requests to server computer 20b for documents stored in DOC storage 70. Server computer 20b then retrieves the requested documents and transmits them back to the requesting user's client computer 20a by way of communications network 80. As is described more fully below, the users' requests for documents may take the form of queries wherein they ask for documents having selected properties. Hence, users of client computers 20a may submit queries (e.g., $Q_1$ 11a, $Q_N$ 11n,) that are transmitted server computer 20b over communications network 80. Documents that match the selected queries are then returned to the requesting computer.

Figure 3:
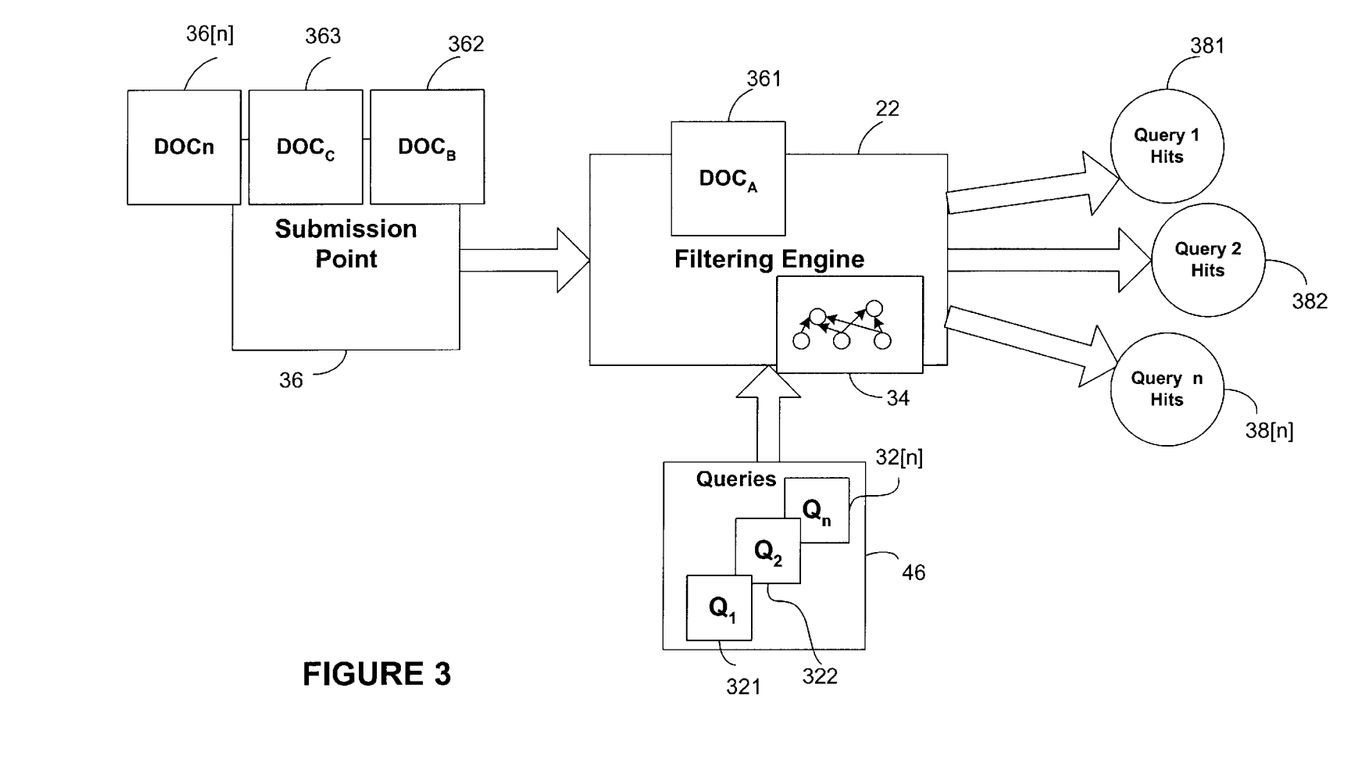
FIG. 3 is a block diagram of the flow of documents and queries in accordance with the invention.

As illustrated in FIG. 3, a number of user queries 321–32[n] are provided to a query set 46 to a filtering engine 22. Filtering engine 22 assembles the queries into a filter 34 as described more fully below. The filtering engine executes, for example, on server computer 20b (FIG. 2). As each document 361–36[n] arrives at submission point 36 from some source of information such as the Internet, an intranet, users, and so on, the filter engine 22 evaluates the content (e.g., text or some other property) of that document 361–36[n] against filter 34. The documents may be individually or simultaneously evaluated against the user queries.

Whether one document or a batch of documents is evaluated, each document is effectively tested against all of the relevant queries, as also described in more detail below. When a document satisfies a given query, that document is associated with the query and thereby made available for delivery to each user that submitted that corresponding query. Delivery may be immediate or scheduled. In an immediate delivery system, a user is immediately notified of documents matching a query. Alternatively, the user may receive the documents which match their query or queries at some predetermined interval, such as once or twice per day, depending on numerous possible variables such as type of subscription, amount of matched documents, and so on. In an interval notification system, a list of documents that match each user's query or queries may be maintained in some table 381–38[n] or the like.

Filtering engine 22 may individually test each document against every query or combine the queries, many of which are common to one another, into a collection of distinct queries, i.e., filters. In the combined approach, the filter engine 22 then evaluates the document(s) against only the collection of distinct queries. The combined approach takes advantage of the likelihood that many users will submit queries which are logically identical, at least in part, to queries and parts thereof submitted by other users. Common expressions need only be tested once, and those expressions that match a document are associated with the queries corresponding thereto.

Figure 4:
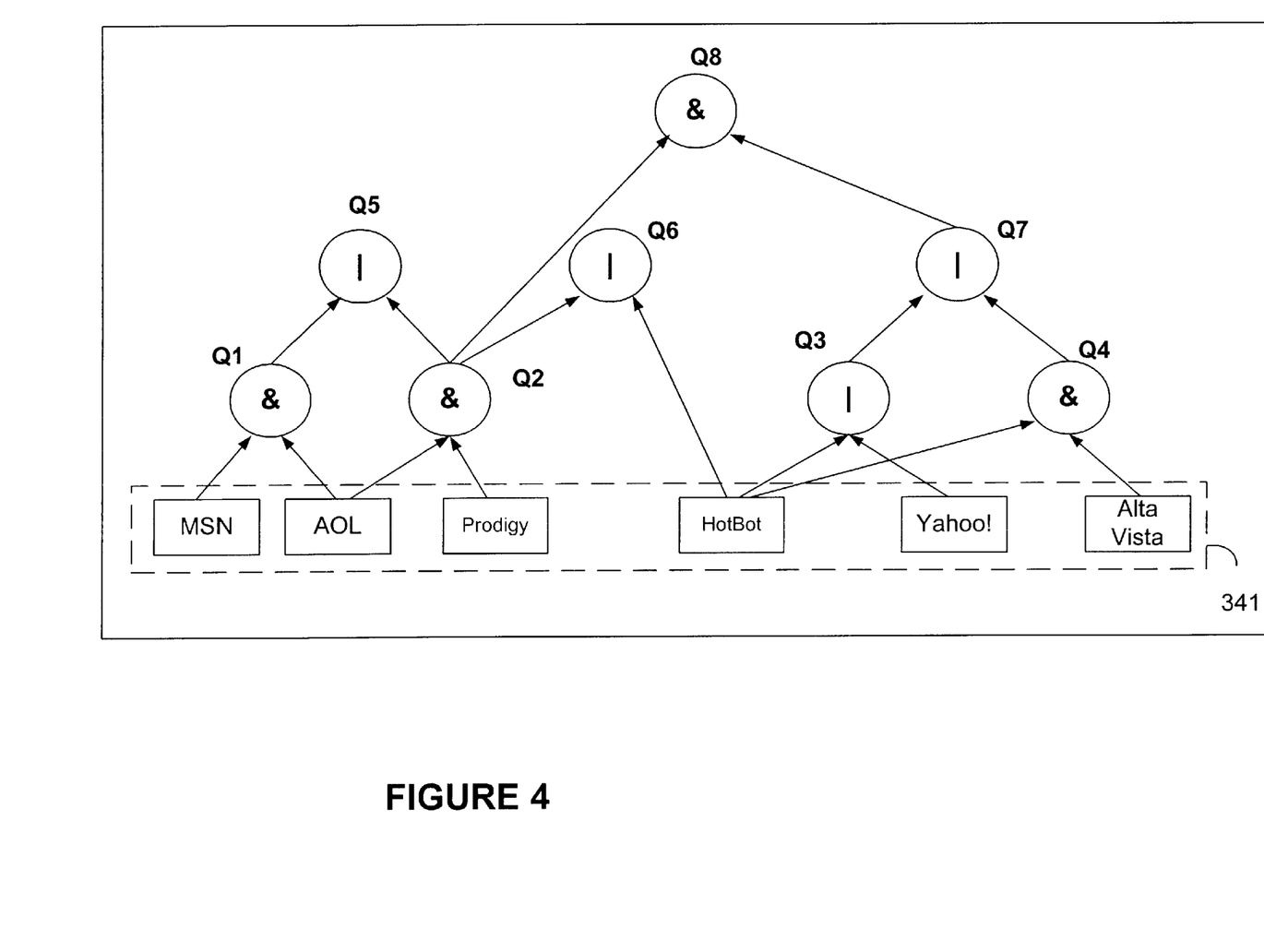
FIG. 4 is an example acyclic graph compiled from a plurality of user queries.

To accomplish the combining of common queries and/or parts thereof, the filtering engine 34 contemplates the use of a directed acyclic graph (DAG) for logically and functionally representing the queries. However, those persons of skill in the art will appreciate that there are other techniques to represent combined queries and the DAG implementation is one illustrative embodiment of such techniques. FIG. 4 illustrates a DAG that is constructed based on a the queries listed below, where "&" represents the Boolean AND operator and "|" represents the Boolean OR operator, and having the usual precedence among Boolean operators (e.g., "&" precedes "|"):

Q1: MSN & AOL
Q2: AOL & Prodigy
Q3: HotBot|Yahoo
Q4: HotBot & Alta Vista
Q5: AOL & MSN|AOL & Prodigy
Q6: AOL & Prodigy|HotBot
Q7: (HotBot|Yahoo)|(HotBot & Alta Vista)
Q8: (AOL & Prodigy) & ((HotBot|Yahoo)|(HotBot & Alta Vista))
Q9: Prodigy & AOL Note that the above terms represent query terms entered by users, and are not intended to represent searching services or on-line services. Also, a two-word term such as Alta Vista is allowable, e.g., by submitting the query with the words "Alta Vista" in quotes or the like. The DAG is constructed from queries Q1–Q9 and comprises a logical graph of nodes, wherein each source node represents a query (search) term submitted by one or more users, and each internal node represents an expression, i.e., a Boolean operator for operating on one or two other nodes. Such a graph is known as directed because edges between the nodes have a direction, and acyclic because traversing the graph will not cycle back to a previous node. Note that a source node is a particular case of a node that is not a successor of any other node. Each source node or internal node has information stored therewith including a type (source or internal node), value (true, false or some value there between), query operator (e.g., AND, OR) and a pointer to each successor node thereof, if any. The number of predecessors of a node is often referred to as the IN degree of the node. It is sufficient to deal with binary and unary operators which produce graphs whose in degree is bounded by 2. This is because graphs with arbitrary IN degree can be embedded in graphs with IN degree bounded by 2. Other information may be stored with a node, (e.g., information about its predecessor nodes).

The DAG is generated from user queries by a DAG construction process. An exemplary DAG construction process is described in U.S. Pat. No. 5,873,081 (the '081 patent), which is assigned to the assignee of the present application and which is hereby incorporated by reference in its entirety. The DAG construction process combines common queries into a distinct query. For example, if eight users individually submit queries seeking all documents containing the terms "AOL" and "MSN", the DAG construction process 42 will construct the DAG 40 such that the eight queries will be represented as one query consisting of source nodes "AOL" and "MSN" connected by an AND node. To associate the query with the users that submitted the query expression, the node representing the single query is mapped to those eight queries, and the queries to the users, such as in a query-to-user table 44. Moreover, common terms and sub-expressions are also combined, e.g., if other users seek documents containing "AOL" and "Prodigy," the same source node in the DAG will represent the term "AOL" in both the distinct "AOL" and "MSN" and "AOL" and "Prodigy" queries. As will be understood below, exploiting this commonality property in a DAG 40 in accordance with the invention provides substantial improvements in document filtering throughput.

As a by-product of constructing the DAG, the query terms are reduced to a set of unique terms, dictionary 341. The invention exploits dictionary 341 and performs the query evaluation in two steps. The architecture of this two-step process is illustrated in the block diagram of FIG. 5. In step one, a document (e.g. $DOC_A$ 361) is reduced to a result set (e.g., result set A 361a). In essence, the result set for a given document lists each query term that is found in the document and the number of times that the term is found. For example, if a document discussed "AOL" and "Yahoo," those terms would appear in the result set along with the number of times those words appeared in the document. The result set may also contain additional information that would be useful in placing the location of a term in the document. For example, the result set could indicate which section of the document a term appeared in. As explained more fully below, the result set is a small subset of the document that would prove useful for evaluating changes to a document against the queries.

Turning to the query evaluation, consider an example document that contains the following content:

<Content> MSN is the best Internet portal. It is far superior to
AOL, Yahoo!, or HotBot. Although AOL has more subscribers, MSN is gaining momentum in subscriber growth.
Moreover, AOL is a closed system that is not very well integrated into the Internet.</Content>

In this example, <Content> and </Content> are control words that mark a property of the document. Here, the control words signify content property, but a document may have a number of other properties including author, size, location, etc.

Figure 5:
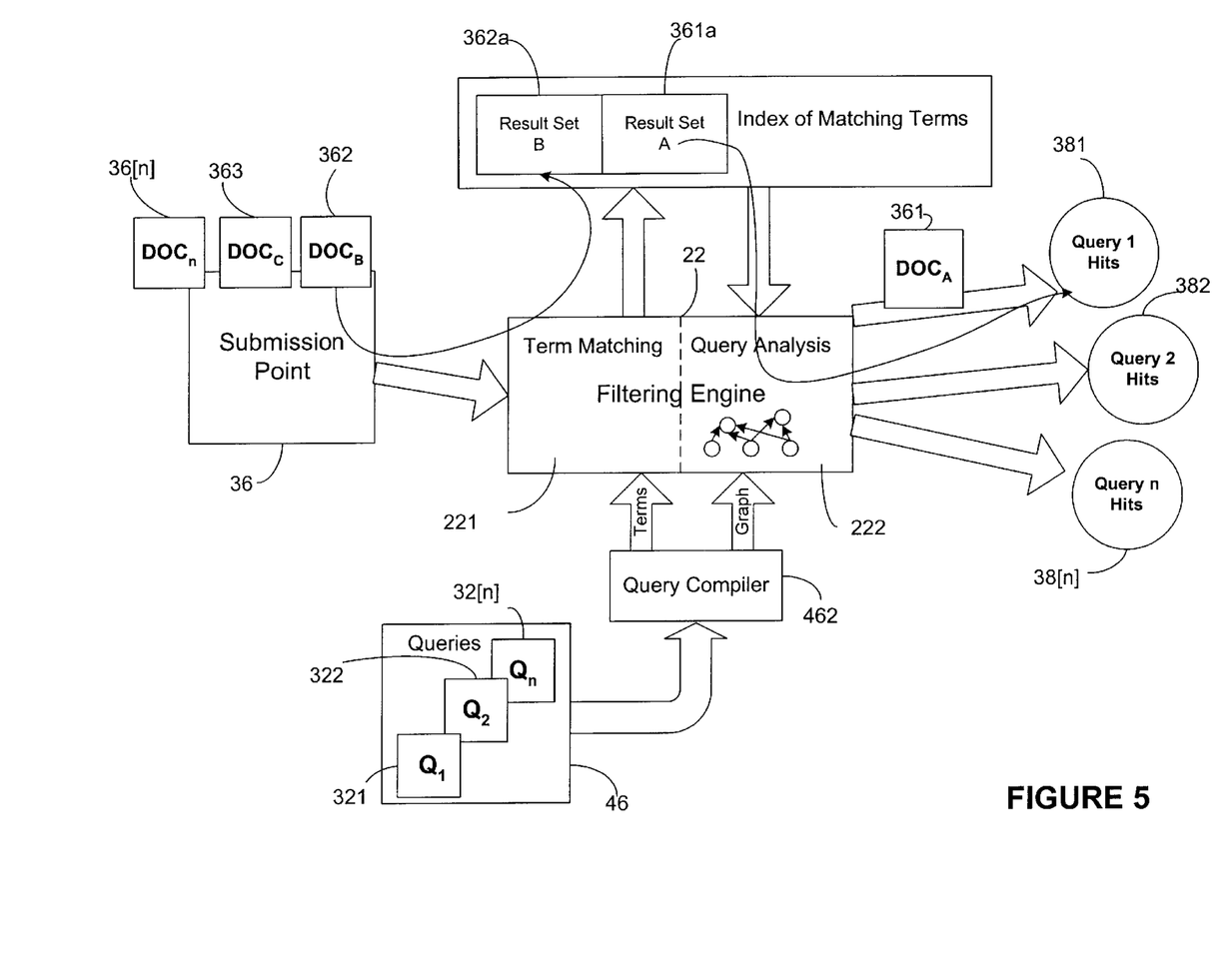
FIG. 5 is a schematic representation of the filtering of documents in accordance with an aspect of the invention.

The term matching 221 portion of filtering engine 22 would compare the contents (i.e. within all properties) of the document against the dictionary 341 and produce the following example result set:

| Term | Count |
|---|---|
| MSN | 2 |
| AOL | 3 |
| Yahoo! | 1 |
| Alta Vista | 1 |

Figure 6:
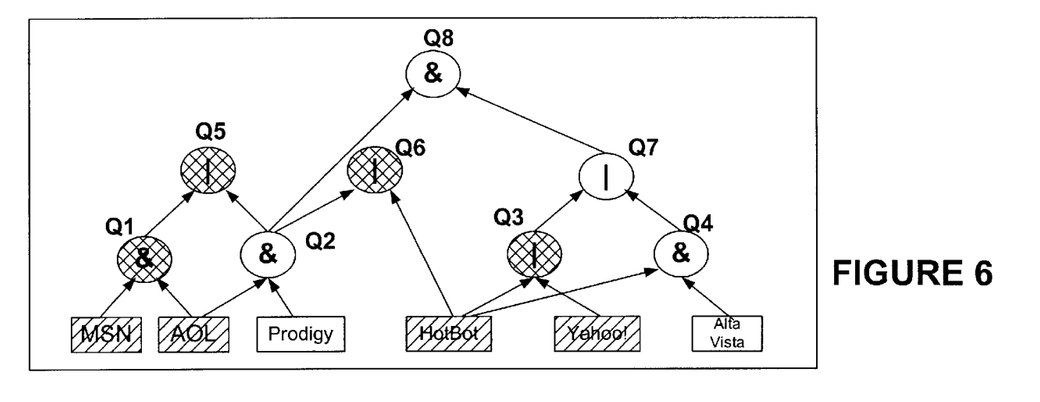
FIG. 6 illustrates the changes to the acyclic graph data structure after filtering a document against the graph.

This result set would then be compared to the DAG and produce the graph as illustrated in FIG. 6. For the present example wherein only monotone queries are present in an exact-match filtering process, the default truth values are all false. The terms found in the result set result in the corresponding source node being set to a "true" state (as indicated by the cross-hatching) and the terms not found remain in a "false" state (as indicated by the lack of cross-hatching). The '081 patent also discloses a process for evaluating the terms against the DAG.

Considering the outcome of the query as indicated by the cross-hatched nodes in the DAG of FIG. 6, the list of users that submitted a matching query can be determined. Accordingly, those users can receive the result of the query, i.e. the document, or receive some other information relating the document to the query, depending on particular system requirements. For example, after the document has been evaluated, the document may be delivered to those identified in the list associated with a query.

As can be appreciated, determining whether a node is true or false requires information about the truth of its arguments, i.e., its left and right predecessor nodes. One way in which this is accomplished is to have each node maintain pointers to its predecessor nodes, from which the truth of the predecessor nodes may be ascertained and operated on according to the Boolean operator of the successor node. Note that this works because of the way in which the DAG is constructed and evaluated, i.e., upwards from left to right, so that predecessor nodes, if evaluated at all, are evaluated before their successors. Those predecessor nodes that are not evaluated essentially remain false. This aspect of the DAG can be exploited to reduce the number of queries that need evaluation when changes (e.g., additional terms are added) are made to the document.

Once the document has been filtered, resulting in a matched list being provided, the state of the nodes can be saved and associated with the document as part of the result set. This can then be used to reduce the time required to evaluate a document when changes are made. One way this can be done is to store a pointer to all nodes that are set "true." Thereafter, the DAG can be reset for evaluation of the next document.

According to an aspect of the invention, when changes are made to a document reevaluation of the document can be simplified so that the entire document does not need to be re-evaluated. As illustrate in FIG. 7, only the changes to the document need to be evaluated against the DAG. The first step is to create a second result set (e.g., result set B' 362b) by apply the same process as described above. After the second result set is generated, there are several alternative embodiments for performing the query analysis 222. One alternative is to simply combine the two result sets together and reanalyze the resulting combined result set. This would follow the query evaluation essentially as described above for the original document; however, by performing term matching 221 only on the changes, processing time is reduced. For example, if the document were changed to include the sentence: "Prodigy was originally designed as a closed system in direct competition with AOL." The new result set would be:

| Term | Count |
|------|-------|
| MSN | 2 |
| Prodigy | 1 |
| AOL | 4 |
| Yahoo! | 1 |
| Alta Vista | 1 |

Notice that Prodigy was added to the result set and the count for AOL was incremented. This new result set would be evaluated and result in the DAG of FIG. 8. Adding Prodigy to the document caused the node Q2 to change to a true state (as indicated by the cross-hatching).

Figure 7:
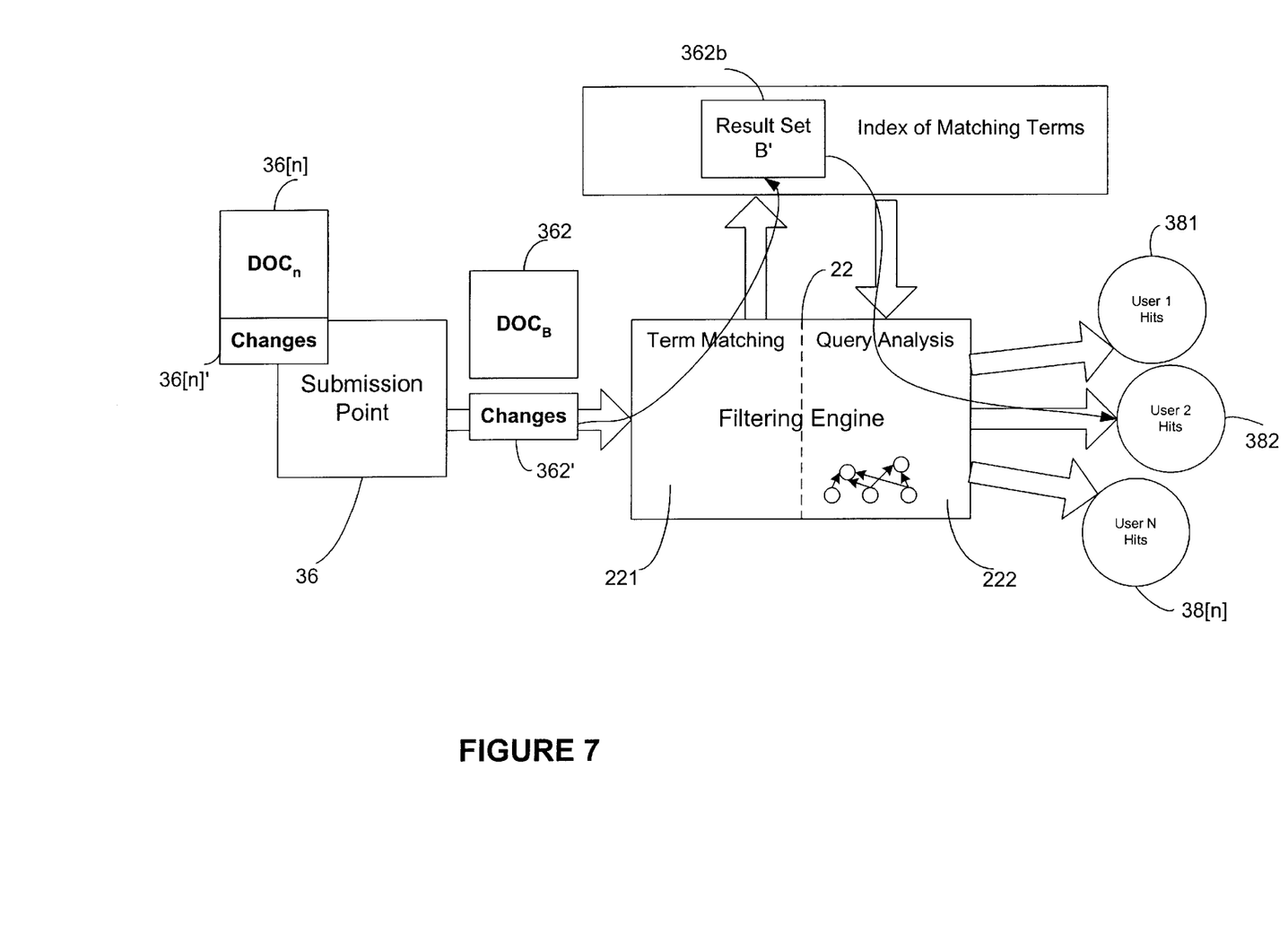
FIG. 7 illustrates the effect on the incremental-results data set caused by changes to a document.
Figure 8:
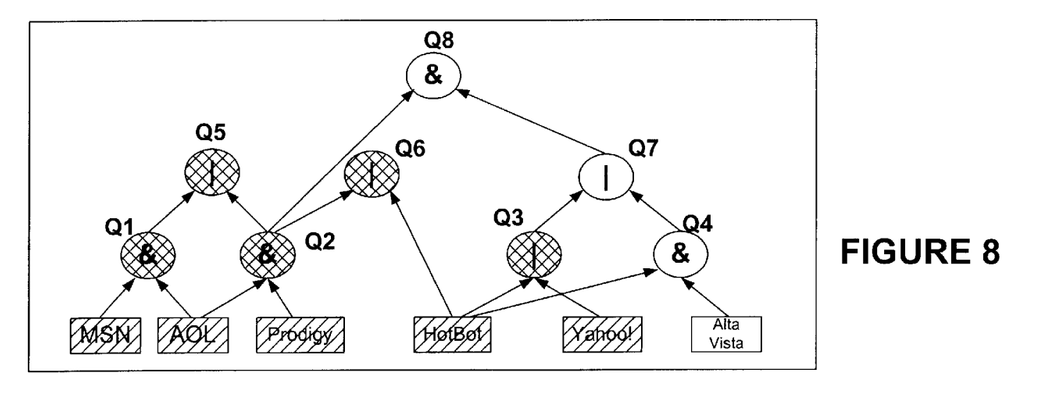
FIG. 8 illustrates the changes to the acyclic graph query resulting from changes to the document.
Figure 9:
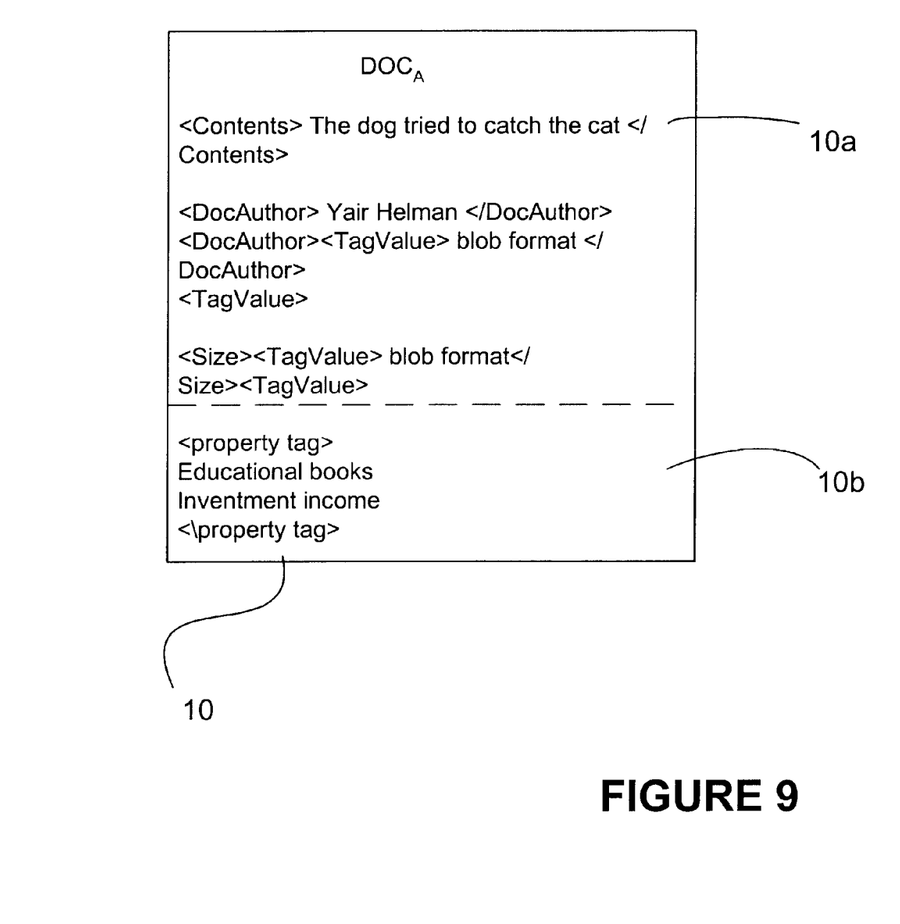
FIG. 9 illustrates typical additive changes to a document.

If an assumption is made that the second result set only contains additions to the previous document, then the processing is further simplified. Such an assumption may be valid where for example additions are made to a document at various stages. For example, after creation of the document, an administrator or like may add term to the document to classify or categorize the document. These additional terms would merely add to the document without deleting terms. For example, FIG. 9 provides an illustrative document 10. As initially created the document consisted of portion 10a. Thereafter, the document may have been entered into the system, such as at submission point 36 (see FIGS. 3 and 5) and filtered against queries. However, after creation, additional information may be added to document 10 such as categorization information. Here the properties "Educational books" and "Investment income" were added to the document. This information may provide an aid in later retrieval of the document and may be added by the author, a reader, or an automated classification process. After the additional terms are added to the document, the present invention provides for filtering the document changes against the DAG as illustrated by FIGS. 7 and 8.

A more complex system could be designed that tracked deletions as well as additions. For example, if the term "AOL" was deleted from the document the term count could be decremented in the result set to reflect the deletion. Thereafter the new result set would be evaluated against the DAG.

A second embodiment of the evaluation of the document changes can reduce the number of queries that need to be re-evaluated. In such a case, the state of the DAG for the original document is restored before filtering the changes. For example, the DAG state information that is retained with the first result set, e.g., 362a as shown in FIG. 5 is used to restore the nodes of the DAG that were set to true. The resulting DAG is as shown in FIG. 6. Thereafter, for each new term added, the tree is traversed according to the following algorithm (using the example of adding Prodigy to the document):

The state of the Prodigy node is changed to true to reflect the added term.

For all false state parent nodes (e.g., Q2)
   Change the state of a false OR node to true
   Change the state of a false AND node to true if all of the other children nodes are true;
Repeat for parent nodes of the query nodes (e.g., Q5).

By using such an algorithm, the number of nodes that need to be evaluated can be greatly reduced particularly where the number of additions is small. In the example here, starting with the prodigy node, the algorithm would move to the Q2 node. The Q2 node would only evaluate AOL & Prodigy. Hence, Q2 would turn true (as indicated by the cross-hatching of Q2 in FIG. 8). From Q2, the algorithm would move to the parent nodes (Q5, Q6, Q8). In evaluating Q5 and Q6, the algorithm would determine that those nodes are already set true and no further analysis would be required. The algorithm would determine that Q8 is false by then determining that Q8 is an AND node and its child Q7 is false. Hence, Q8 remains false.

Figure 10:
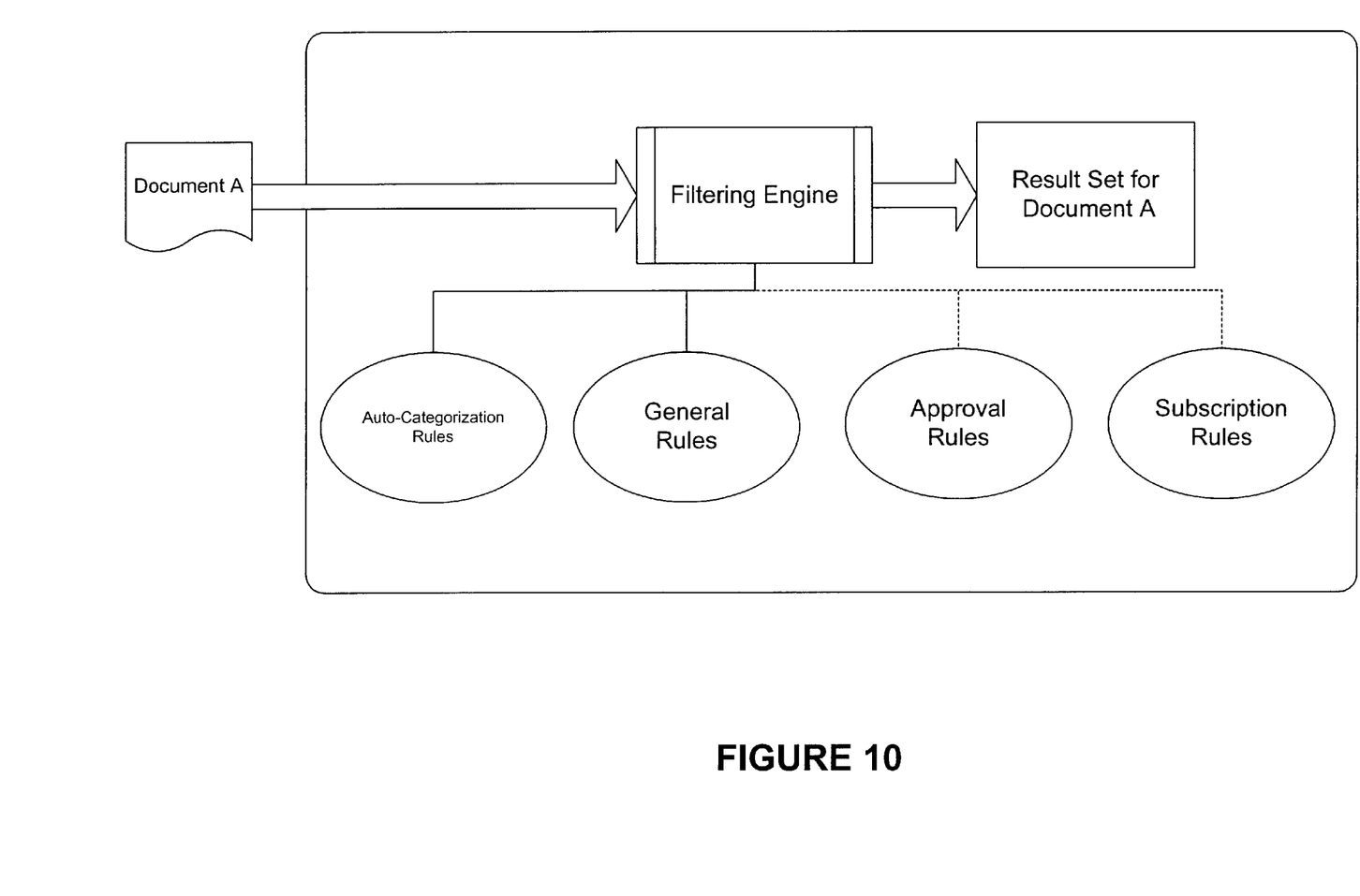
FIGS. 10–12 illustrate a system in which the present invention may be incorporated wherein a document is processed through several phases and wherein the document undergoes incremental changes during each phase.
Figure 11:
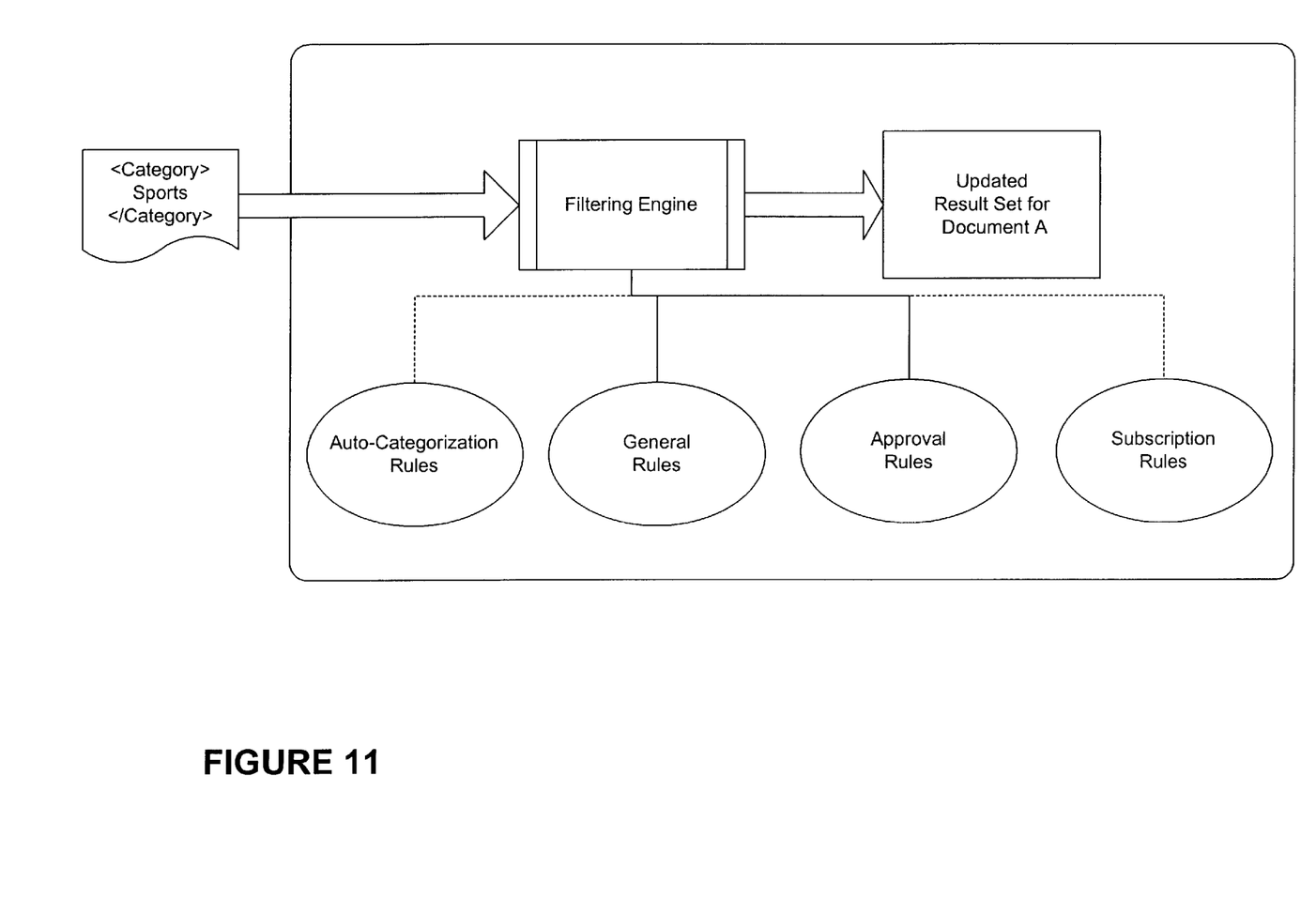
Figure 12:
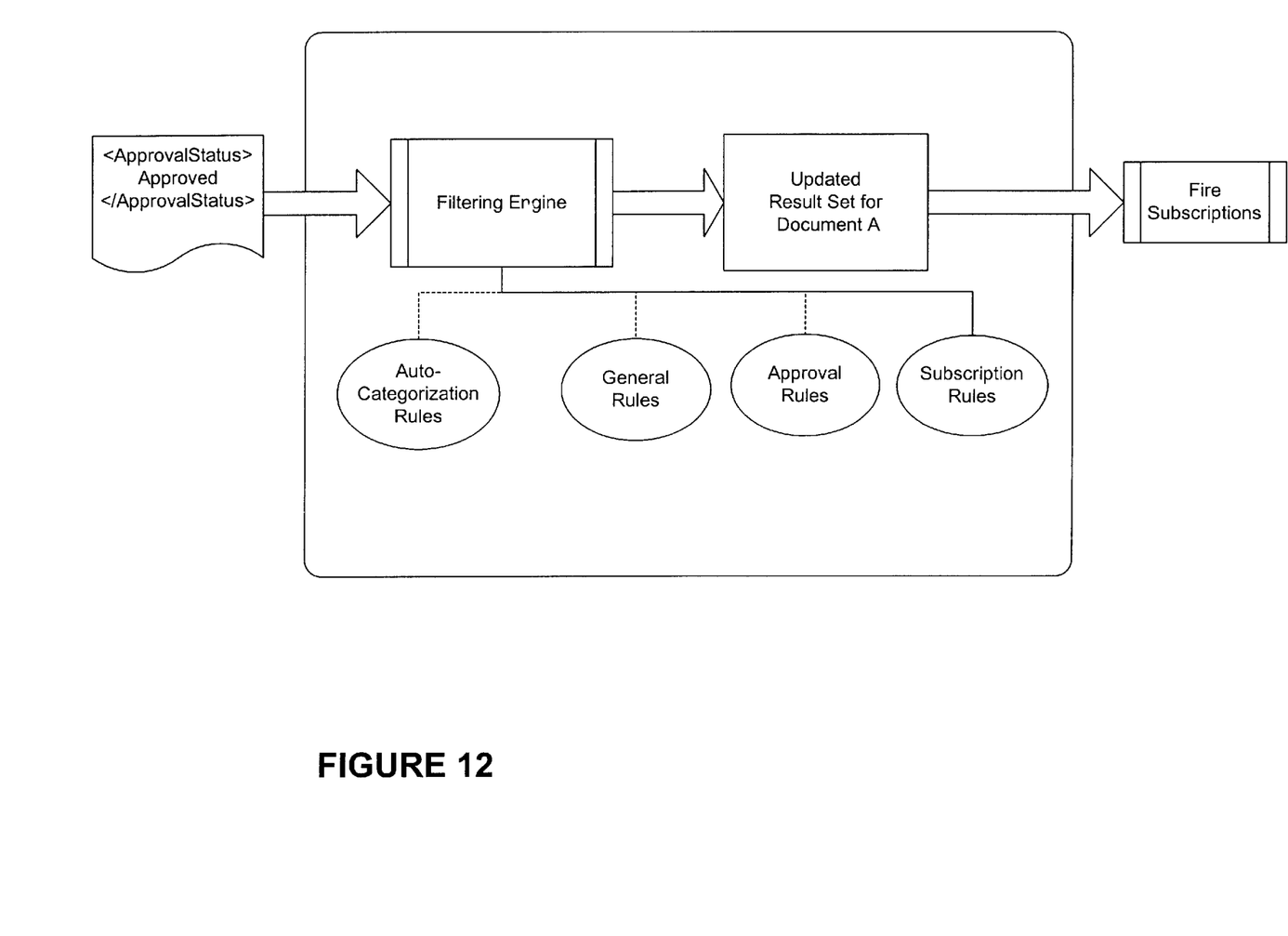

FIG. 10–12 further illustrates an example operation of the present invention wherein a document undergoes changes during various phases. Here, the document proceeds through three phases wherein changes are made to the document. After the changes from one phase, the document is filtered against queries from a second phase and may undergo additional changes before undergoing further filtering.

FIG. 10 illustrates a Document A initially entering the filtering engine. The filtering engine generates a result set for the document in accordance with the description above by combining all of the query terms from all of the rule sets, i.e., Auto-Categorization, General Rules, Approval Rules, and Subscription Rules. Thereafter, the result set is filtered against a subset of the rules, e.g., Auto-Categorization and General Rules. The Auto-Categorization rules may be queries that are built by an administrator that filter documents by predetermined categories and automatically assign the document to selected ones of the predefined categories. In so doing, the auto-categorization may change the document typically by adding new properties based on the various predefined rules. For example, a property tag <Category>Sports</Category> would be added to documents containing the word "baseball." Such auto-categorization is based on sophisticated content-based rules. Additionally, general categorization could be used to apply miscellaneous rules such as "if <Size> is greater than two gigabytes then move offline."

As illustrated in FIG. 11, after the first set of rules is applied to the document, the document may undergo changes as described. However, in the second phase different rules may apply and those rules may rely, at least in part, on the changes made to the document during the first phase. For example, the approval-rules may apply to all documents that have been categorized under "Sports" and that have a size less than two gigabytes. If so, the approval rules may add an additional property tag of the form: <ApprovalStatus> Approved </ApprovalStatus>.

Because the first set of rules only makes minor changes to the document, the present invention capitalizes by only filtering the portion of the document that changed. Thus, the entire document does not need to be reprocessed before applying the second set of rules. Instead, the system could function by merely processing the small changed portion through the filtering engine or adding together the result set from phase one to the incremental results set of phase two any performing query analysis on the new result set. On the one hand, where the subsequent phase is solely dependent on the properties added by a preceding phase, then the former alternative may offer some performance advantages. On the other hand, where a succeeding phase depends on the entire document properties, then the latter alternative offers advantages.

FIG. 12 illustrates the operation of a third phase wherein subscription rules are applied. Subscription rules are typically user submitted query rules that request documents having certain user-defined characteristics. For example, a user may subscribe to all documents categorized under "Sports" and discussing "baseball" in the contents. Documents meeting the subscription rules are then fired out to the subscribers (either by sending immediate notification or by storing results for later notification).

While the invention is susceptible to various modifications and alternative constructions, certain illustrated embodiments have been shown in the drawings and accompanying detailed description. It should be understood, however, that there is no intention to limit the invention to the specific constructions disclosed herein. On the contrary, the invention is intended to cover all modifications, alternative constructions, and equivalents falling within the scope and spirit of the invention.

What is claimed is:

1. A method for incrementally filtering a document against a set of queries each of which comprises at least one term, comprising the acts of:
    creating a set of substantially unique terms from the set of queries;
    creating a result set comprising terms in the document that match the set of substantially unique terms;
    associating the result set with the document so that the document may be evaluated against the set of queries by evaluating the result set against the set of queries; and
    thereafter, updating the result set to reflect changes to the document by comparing the changed portion of the document to the set of substantially unique terms.

2. The method as recited in claim 1 wherein the act of evaluating the result set against the plurality of queries comprises compiling the plurality of queries into a directed acyclic graph having a plurality of nodes, each node in the graph including pointers to any successor nodes thereof, the terms in the queries serving as source nodes in the graph and the operators serving as internal nodes wherein the result set is evaluated by comparing the terms in result set with the source nodes in the directed acyclic graph, and for each term that matches a source node, evaluating an internal successor node of the matched source node based on the logical operator represented by the successor node and the truth information of the predecessor nodes thereto, to determine a truth value of said internal successor node; and returning truth information indicative of which of the successor nodes were evaluated as true.

3. The method as recited in claim 1 further comprising the act of evaluating the updated result set against the plurality of queries.

4. The method as recited in claim 1 wherein the changes to the document comprise the addition of at least one term to the document.

5. A computer-readable medium bearing computer-readable instructions for instructing a computer to carry out the acts recited in claim 1.

6. A system for selecting a document for a user comprising:
    a module that accepts from a user a query containing terms and operators;
    a module that compiles said user query with other queries into a set of unique query terms;
    a module that accepts a plurality of documents;
    a module that compiles for each of said plurality of documents a result set of terms substantially similar to said unique query terms;
    a module that stores each said result set in association with a corresponding document; and
    a module that selects for said user a document having a result set with terms substantially matching the terms and operators of the user's query.

7. The system as recited in claim 6 further comprising a module for updating the result set when changes are made to the corresponding document.

8. The system as recited in claim 7 wherein the module that updates the result set can create a result set for changes to a document without the need for compiling the entire document.

9. The system as recited in claim 8 further comprising a module that selects for said user a document having an updated result set with terms matching the terms and operators of the user's query by comparing the updated result set against the query.

10. The system as recited in claim 9 wherein the module for selects for the user documents having a result set with terms substantially matching the terms and operators of the user's query comprises computer readable instruction that embeds the query into a directed acyclic graph structure having a plurality of nodes, each node in the graph including pointers to any successor nodes thereof, the terms in the query embedded as source nodes in the graph and operators embedded as internal nodes and evaluates documents by evaluating the result set against the nodes of the directed acyclic graph.

11. The system as recited in claim 10 further comprising computer readable instructions for setting the state of a node to indicate the truth value of its operation.

12. The system as recited in claim 11 further comprising storing the state of the nodes of the directed acyclic graph in association with a document that was evaluated against the directed acyclic graph.

13. The system as recited in claim 12 wherein the module that selects for said user a document having an updated result set comprises computer readable instructions that restore the state of the directed acyclic graph associated with the document and that changes the state of additional nodes as a function of the updates to the result set.

14. A method for filtering documents against user queries, comprising the acts of:

receiving a plurality of user queries, the queries including terms connected by logical operators;

creating a dictionary of terms from said users queries;

generating a results data set wherein said results data set comprises words in said document matching words in said dictionary;

storing said results data set in association with said document;

generating an incremental results data set each time a document is changed wherein said incremental results data set comprises words in said changed portion of said document matching words in said dictionary; and evaluating a document against the plurality of user queries by comparing the results data set terms and the incremental results data set terms to the terms of each of the users queries.

15. The method as recited in claim 14 wherein the act of evaluating a document comprises compiling the plurality of queries into a directed acyclic graph having a plurality of nodes, each node in the graph including pointers to any successor nodes thereof, the terms in the queries serving as source nodes in the graph and the logical operators serving as internal nodes wherein the result set and the incremental result set are evaluated by comparing the terms in result set and the incremental result sets with the source nodes in the directed acyclic graph, and for each term that matches a source node, evaluating an internal successor node of the matched source node based on the logical operator represented by the successor node and the truth information of the predecessor nodes thereto, to determine a truth value of said internal successor node; and returning truth information indicative of which of the successor nodes were evaluated as true.

16. The method as recited in claim 15 wherein the result set and the incremental result set may be combined into a single result set.

17. The method as recited in claim 15 wherein the state of the nodes of the directed acyclic graph may be stored in association with a result set whereby the state of the directed acyclic graph is restored from the stored state before an incremental result set is evaluated.

18. A computer readable medium bearing computer executable instructions for carrying out the acts recited in claim 14.

* * * * *

UNITED STATES PATENT AND TRADEMARK OFFICE
CERTIFICATE OF CORRECTION

PATENT NO.    : 6,505,190 B1                                     Page 1 of 1
DATED         : January 7, 2003
INVENTOR(S)   : Dov Harel et al.

It is certified that error appears in the above-identified patent and that said Letters Patent is hereby corrected as shown below:

Column 2,
Line 65, insert -- a -- before "schematic";

Column 3,
Line 39, delete "documetn" and insert -- documents -- therefor;
Line 65, delete "to";

Column 9,
Line 26, delete "illustrate" and insert -- illustrated -- therefor.
Line 29, delete "apply" and insert -- applying -- therefor.

Signed and Sealed this

Fourth Day of November, 2003

JAMES E. ROGAN
*Director of the United States Patent and Trademark Office*